(12) United States Patent
Laverne et al.

(10) Patent No.: US 10,871,232 B2
(45) Date of Patent: Dec. 22, 2020

(54) AIRCRAFT GAP SEAL

(71) Applicant: AIRBUS OPERATIONS LIMITED, Bristol (GB)

(72) Inventors: Julien Laverne, Bristol (GB); Philip Jaggard, Bristol (GB); Matt Harding, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 450 days.

(21) Appl. No.: 15/813,516

(22) Filed: Nov. 15, 2017

(65) Prior Publication Data
US 2018/0135760 A1    May 17, 2018

(30) Foreign Application Priority Data

Nov. 15, 2016 (GB) .................................. 1619292.4

(51) Int. Cl.
| | |
|---|---|
| *F16J 15/447* | (2006.01) |
| *B64C 1/12* | (2006.01) |
| *B64C 3/26* | (2006.01) |
| *B64C 9/00* | (2006.01) |
| *F16J 15/10* | (2006.01) |

(52) U.S. Cl.
CPC ............... *F16J 15/447* (2013.01); *B64C 1/12* (2013.01); *B64C 3/26* (2013.01); *F16J 15/104* (2013.01); *B64C 9/00* (2013.01)

(58) Field of Classification Search
CPC .......... F16J 15/447; F16J 15/104; F16J 15/00; B64C 3/26; B64C 1/12; B64C 9/00; B64C 1/0009; B64C 3/36; B64C 7/00; B64C 9/02

USPC ......................................................... 244/130
See application file for complete search history.

(56) References Cited

U.S. PATENT DOCUMENTS

| | | | |
|---|---|---|---|
| 6,009,669 A | | 1/2000 | Jardine et al. |
| 9,004,404 B2 * | | 4/2015 | West ...................... F16J 15/104 |
| | | | 244/130 |
| 10,017,239 B2 * | | 7/2018 | Neal ...................... F16J 15/064 |
| 2008/0035788 A1 | | 2/2008 | Kothera et al. |
| 2009/0267304 A1 | | 10/2009 | Wildman |

(Continued)

FOREIGN PATENT DOCUMENTS

| | | |
|---|---|---|
| CN | 104763772 | 7/2015 |
| EP | 1 661 805 | 5/2006 |

(Continued)

OTHER PUBLICATIONS

Combined Search and Examination Report for GB1619292.4 dated May 16, 2017, 6 pages.

(Continued)

*Primary Examiner* — Christopher P Ellis
(74) *Attorney, Agent, or Firm* — Nixon & Vanderhye P.C.

(57) ABSTRACT

An aircraft assembly including: first and second external skin panels having opposing edge faces separated by a gap, the gap having a width in a first direction extending between the opposing edge faces and a depth in a second direction generally orthogonal to the first direction; and a gap seal arranged in the gap to at least partially fill the gap, wherein the gap seal is formed of a material configured such that compression of the gap seal in the first direction results in substantially no expansion of the gap seal in the second direction.

17 Claims, 4 Drawing Sheets

(56) References Cited

U.S. PATENT DOCUMENTS

| | | |
|---|---|---|
| 2010/0288888 A1 | 11/2010 | Coconnier |
| 2011/0059291 A1* | 3/2011 | Boyce .................. C08J 5/00 |
| | | 428/136 |
| 2013/0168496 A1* | 7/2013 | Roth .................. F16J 15/062 |
| | | 244/131 |

FOREIGN PATENT DOCUMENTS

| | | |
|---|---|---|
| EP | 2 587 038 | 5/2013 |
| GB | 2514074 | 11/2014 |
| WO | WO-2011148167 A2 * 12/2011 | .................. 244/124 |

OTHER PUBLICATIONS

G. Carta et al., "Continuous and discrete microstructured materials with null Poisson's ratio", *Journal of the European Ceramic Society*, Dec. 31, 2015, 20 pages.

\* cited by examiner

AIRCRAFT GAP SEAL

RELATED APPLICATION

This application claims priority to GB 1619292.4 filed 15 Nov. 2016, the entire contents of which application is incorporated by reference.

FIELD OF THE INVENTION

The present invention relates to a seal for sealing a gap between panels in an aircraft assembly.

BACKGROUND OF THE INVENTION

Unfilled gaps between adjacent panels on the aerodynamic surface of an aircraft are undesirable because they generate a drag penalty. Gaps between panels which may move relative to one another are typically filled with an elastomeric seal member which can be compressed as the gap closes. Gaps between fixed panels (i.e. panels which are not intended to be moved during operation of the aircraft) are typically filled with a curable sealant such as a polysulphide sealant.

SUMMARY OF THE INVENTION

At its most general the present invention provides an aircraft gap seal formed from a material that, when compressed in the gap width direction, does not expand in the gap depth direction.

A first aspect of the invention provides an aircraft assembly, comprising: first and second external skin panels having opposing edge faces separated by a gap, the gap having a width in a first direction extending between the opposing edge faces and a depth in a second direction generally orthogonal to the first direction; and a gap seal arranged in the gap to at least partially fill the gap, wherein the gap seal comprises material configured such that compression of the gap seal in the first direction results in substantially no expansion of the gap seal in the second direction.

A second related aspect of the invention provides a gap seal for an aircraft assembly comprising first and second external skin panels having opposing edge faces separated by a gap, the gap having a width in a first direction extending between the opposing edge faces and a depth in a second direction generally orthogonal to the first direction, the gap seal being configured to be arranged in the gap to at least partially fill the gap, and the gap seal comprising material configured such that compression of the gap seal in the first direction results in substantially no expansion of the gap seal in the second direction.

Known gap seals, such as those discussed above, suffer from the disadvantage that when they are highly compressed they may protrude out of the gap to form a drag-inducing aerodynamic step. Elastomeric seal members, such as rubber gasket-type seals having an O- or D-shaped cross-section, or lip-type seals, in particular provide a compromised solution because their shape means that they are unable to completely fill the gap without such unwanted protrusion. Cured sealant beads also suffer from the defect that compression across the gap leads to protrusion out of the gap, and also have the disadvantage that they typically do not completely eliminate the gap in their uncompressed state, but instead provide a shallow depression in the aerodynamic surface.

The present inventors have identified that these problems may be solved by forming a novel gap seal from a material which, when compressed in the gap width direction, does not substantially expand in the gap depth direction.

The invention is particularly advantageously applied in aircraft assemblies in which there may be some (minor or significant) movement between the first and second panels during aircraft operations. For example, one of the first or second panels may comprise a fairing (i.e. a panel solely for the purpose of improving aerodynamic performance e.g. by concealing drag-inducing structure or systems), control surface, or movable panel such as an access door (e.g. landing gear bay door).

In preferred embodiments the material of the gap seal has a poisson's ratio in at least the first direction equal to or less than 0.1, more preferably equal to or less than 0.06, and most preferably equal to or less than 0.05. Poisson's ratio is the negative ratio of transverse to axial strain, i.e. the fraction of resulting expansion divided by the fraction of applied compression. Elastomers, which are commonly used in aircraft gap seals, typically have a poisson's ratio in the region of 0.4999.

In some embodiments such low poisson's ratios are achieved by controlling the micro- or macro-structure of the material. For example, the material of the gap seal may comprise a grid of cells. Each cell may have at least third order rotational symmetry, preferably fourth, fifth or sixth order symmetry. The grid may comprise a lattice/array of identical cells.

In such embodiments the material may comprise a substrate and each cell may comprise a uniform pattern of apertures in the substrate. Such an arrangement can have the advantage of providing a relatively 'closed' structure in which the seal comprises a higher percentage by volume of substrate than void/aperture. This may help to ensure that the seal is able to withstand the environmental conditions encountered during flight. Such an arrangement may also provide for relatively straightforward manufacture.

The material is preferably formed from one of the following: polyurethane; polytetrafluoroethylene; an elastomer, including silicon rubber or neoprene; or cork. Polytetrafluoroethylene, polyurethane and elastomers all have a poisson's ratio in the region of 0.45-0.5, and therefore exhibit significant transverse expansion in response to axial compression. However, by engineering such materials so that they exhibit a low poisson's ratio (equal to or less than 0.1, more preferably equal to or less than 0.06, and most preferably equal to or less than 0.05) in at least the first direction, they are suitable for the gap seal of the present invention. This may be achieved by providing the material as a foam, by forming a grid of cells from a substrate of the material, by forming a lattice of cells each comprising a plurality of interconnected arms, or in any other suitable way.

The first and second external skin panels may be able to move relative to one another between a first configuration in which the gap seal is arranged in the gap to at least partially fill the gap and a second configuration in which the gap seal is compressed in the first direction. For example, one of the first and second skin panels may comprise a panel of a movable control surface, an access door (e.g. landing gear bay door), or a panel of a folding wing assembly.

Such embodiments may include a blade seal attached to the first or second external skin panel and extending across the width of the gap to obscure the gap in at least the second configuration. The blade seal thus serves to prevent pressure differences across the panels from causing the gap seal to be dislodged from the gap, e.g. by being 'blown' or 'sucked' out of the gap. The blade seal is preferably attached to an internal surface of the first or second skin panel.

The blade seal is preferably configured to slide relative to the other of the first or second external skin panel, respectively, during relative movement of the first and second external skin panels. In this way, relative movement of the panels is not hindered, and the blade seal cannot transmit loads (forces) between the first and second panels.

In some embodiments the gap seal is fixed (i.e. attached, fastened or otherwise secured) to the opposing edge face of a respective one of the first or second external skin panel, and is not fixed to the opposing edge face of the other of the first or second external skin panel. In this way, relative movement of the panels is not hindered, but the gap seal is retained within the gap. The gap seal may be fixed to the opposing edge face of the first or second external skin panel by bonding.

The assembly may include a friction layer between the gap seal and the opposing edge face of the other of the first or second external skin panel, wherein the friction layer has a higher coefficient of friction than the gap seal. Thus, the gap seal is securely retained within the gap during compression in the first direction.

A respective one of the first and second external skin panels may comprise a panel of a movable control surface or an access door such as a landing gear bay door. Alternatively, the first and second external skin panels each comprise a fixed panel, i.e. a panel that is normally fixed in place during aircraft operations (e.g. ground operations, or flight operations).

The present invention may be applied to folding wing arrangements. In such arrangements the aircraft assembly includes an inner wing section comprising the first external skin panel, and an outer wing section comprising the second external skin panel, the outer wing being pivotable relative to the inner wing between a folded configuration in which the first and second external skin panels are separated, and a flight configuration in which the gap seal is compressed in the first direction. Thus, the gap between panels at either side of the inner-outer wing joint can be easily, accurately and completely filled when the wing is unfolded to its flight configuration, without any additional process step. Moreover, undesirable aerodynamic steps are also avoided.

A third aspect of the invention provides an aircraft comprising an assembly or a gap seal according to the first or second aspects.

Any of the optional, or desirable, features of the invention described herein can be applied to any aspect of the invention, either individually or in any combination.

BRIEF DESCRIPTION OF THE DRAWINGS

Embodiments of the invention will now be described with reference to the accompanying drawings, in which.

DETAILED DESCRIPTION OF EMBODIMENT(S)

Figure 1B:
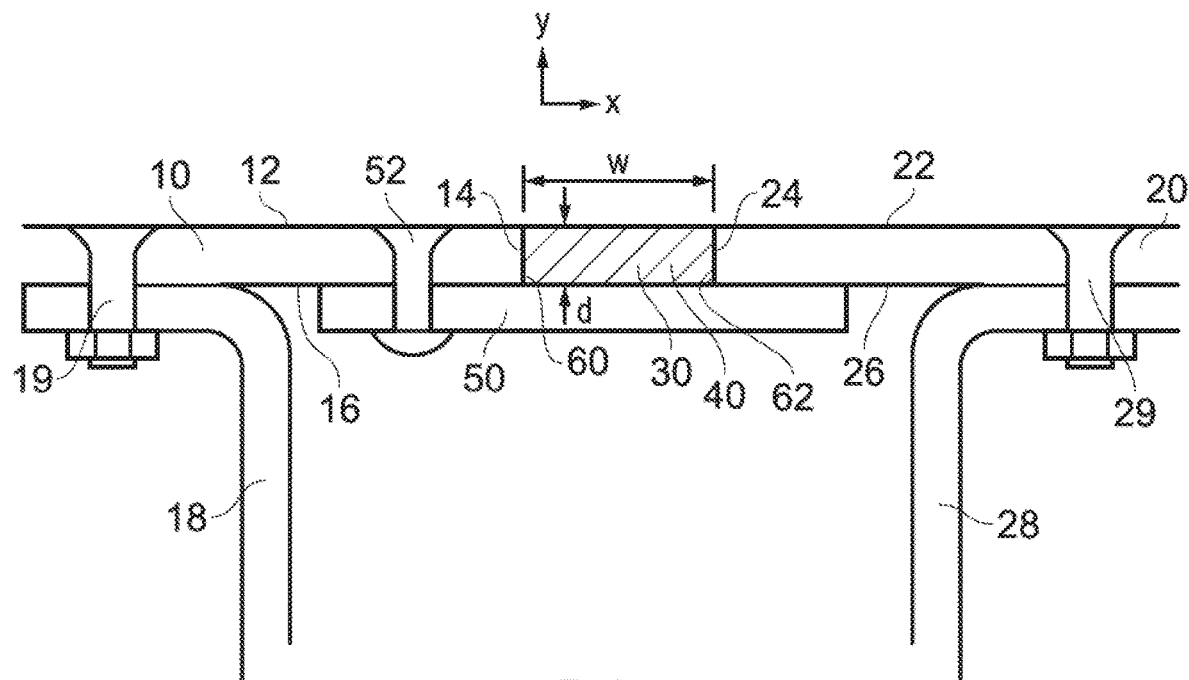
FIGS. 1A and 1B show plan and section views, respectively, illustrating an aircraft panel assembly according to an embodiment of the invention.
Figure 1A:
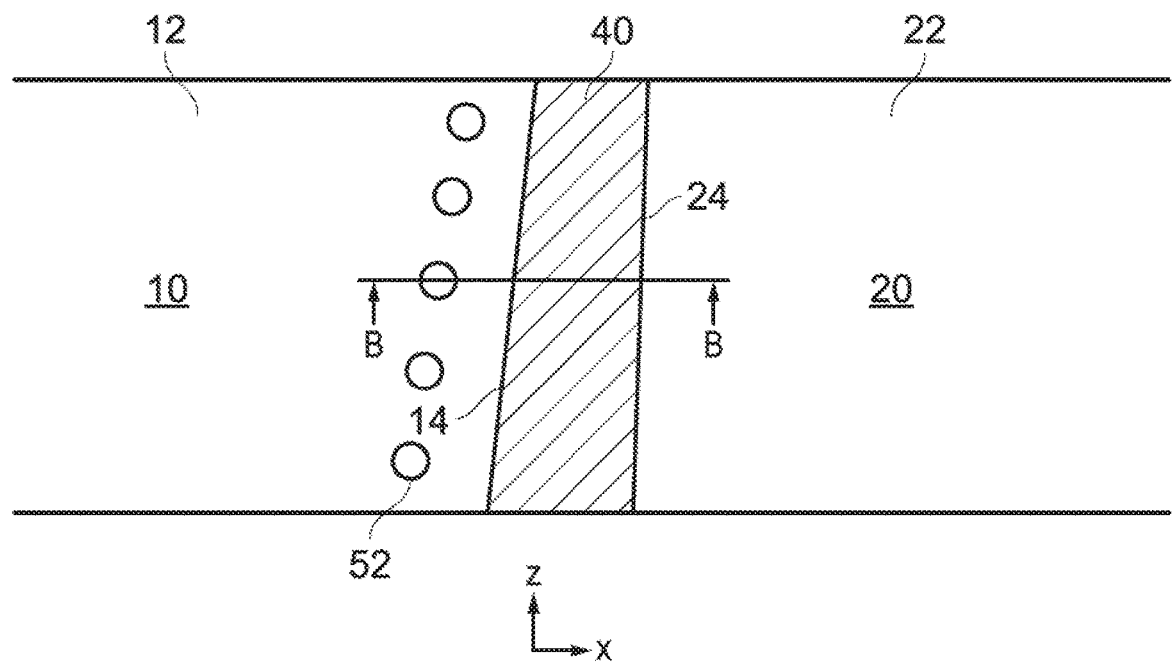

FIGS. 1A and 1B show plan and section views, respectively, of an aircraft panel assembly according to an embodiment of the invention. First 10 and second 20 panels are arranged adjacent one another so that their outer surfaces 12, 22 together form an aerodynamic surface of the aircraft. The first 10 and second 20 panels are supported by respective structural members 18, 28 to which they are attached by a respective row of fasteners 19, 29.

In this embodiment loads (forces) are not transferred directly between the first 10 and second 20 panels, though such loads may instead be transmitted via a structural connection (not shown; e.g. a buttstrap). The first 10 and second 20 panels may each comprise a fixed or movable panel, i.e. a panel that is configured to be either fixed or movable during operation of the aircraft. For example, the panels may both be fixed during flight of the aircraft, or one or both of the panels may be movable during flight of the aircraft. The panels may each be fixed during flight, but movable during maintenance or ground manoeuvres.

Examples of applications for an aircraft assembly according to the present invention include, but are not limited to:

Both first and second panels are fixed panels (fixed in flight):
  adjacent wingbox cover fixed panels;
  wingbox cover fixed panel to adjacent leading or trailing edge fixed panel;
  wing fixed panel to fairing panel; and
  adjacent fuselage fixed panels.

First panel is fixed and second panel is moveable in flight:
  wingbox cover fixed panel to movable control surface (e.g. spoiler or aileron) panel; and
  fixed panel adjacent openable landing gear bay door.

First panel is fixed and second panel is movable on the ground:
  fixed panel to adjacent access panel; and
  adjacent wing panels at folding wing tip join (see embodiment below).

The panels 10, 20 are separated by a gap 30 which extends between opposing edge faces 14, 24 of the panels. The gap 30 thus has a width, w, defined as a distance between the opposing edge faces 14, 24 in a first direction (x-direction in FIG. 1), and a depth, d, defined as a distance between a base of the gap 30 and the aerodynamic surface in a second direction (y-direction in FIG. 1). The width, w, and depth, d, may vary along the length of the gap 30 (z-direction in FIG. 1).

A gap seal 40 is positioned within the gap 30 so that it substantially fills the gap. The gap seal 40 has a shape corresponding to that of the gap 30 such that it is elongate and has a generally rectangular cross-section. The gap seal 40 thus has a height generally corresponding to the depth, d, of the gap, and a width generally corresponding to the width, w, of the gap. In other embodiments the gap seal 40 may only partially fill the gap 30; for example, the width of the gap seal 40 may be less than the width, w, of the gap 30 along some or all of the length of the gap.

The gap seal 40 thus serves to at least partially fill the gap 30 to minimise parasitic drag at the gap generated by airflow travelling over the aerodynamic surface 12, 22.

A generally planar blade seal 50 is fastened at one side to the first panel 10 via a row of fasteners 52 and extends across the full width of the gap 30 so that it lies in contact with internal surfaces 16, 26 of the first 10 and second 20 panels, and with a surface of the gap seal 40. The blade seal 50 is not attached to the second panel 20, and preferably has a low-friction surface finish, layer or coating at the interface with the second panel 20 to permit relative sliding between the two parts. The blade seal 50 has an elongate generally four-sided shape such that it obscures the gap 30 along its width and length.

The blade seal 50 serves to prevent differential pressures between the internal and external surfaces of the panels 10, 20 from causing the gap seal 40 to be dislodged from the gap 30. It is only attached to one of the panels 10, 20 for two reasons: in embodiments in which there is significant relative movement between the panels 10, 20, to permit such relative movement; and in embodiments with only small, or negligible, amounts of relative movement between the panels, to prevent any load transfer between the panels in the event of relative movement between the panels 10, 20.

The gap seal 40 is attached to the opposed edge 14 of the first panel 10 via an adhesive layer 60 to further anchor the gap seal 40 in the gap 30. The gap seal 40 is not attached to the second panel 10 directly, but a high-friction fabric layer or high-friction coating 62 on the surface of the gap seal 40 that abuts the opposed edge 24 of the second panel 20 provides an indirect and impermanent attachment therebetween. In this way, the risk of the gap seal 40 becoming dislodged from the gap 30 during relative movement of the panels 10, 20 is reduced since, from the initial contact between the opposed edge 24 and the high-friction layer/coating, sliding of the gap seal 40 relative to the gap 30 in the y-direction is prevented.

Figure 2A:
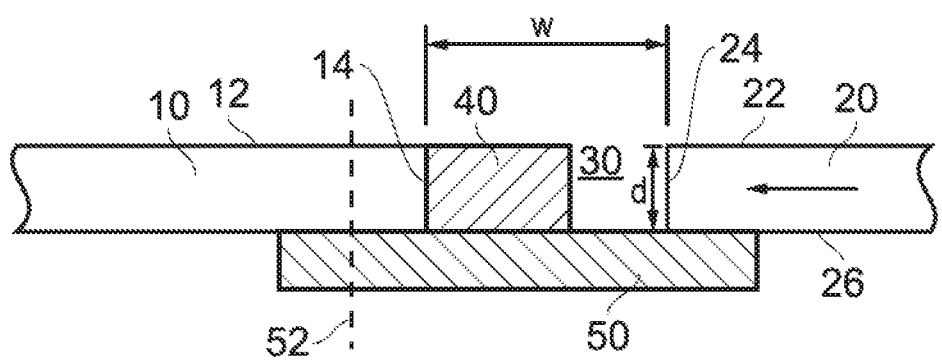
FIGS. 2A and 2B show section views illustrating the aircraft panel assembly of FIGS. 1A and 1B in a closing configuration and closed configuration, respectively.
Figure 2B:
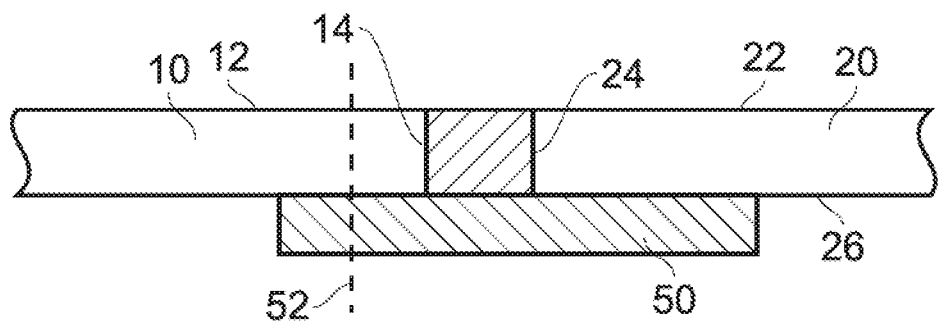

FIGS. 2A and 2B illustrate the assembly of FIGS. 1A and 1B in use. In the initial closing configuration shown in FIG. 2A the gap seal 40 partially extends across the width, w, of the gap 30, and extends across its full depth, d. Thus, the gap seal 40 is not compressed in the closing configuration.

As the first and second panels 10, 20 move towards one another towards the closed configuration shown in FIG. 2B, the width, w, of the gap 30 reduces so that the internal surface 26 of the second panel 20 slides across the blade seal 50, and the gap seal 40 is compressed in the first direction (the width direction). As a result of this compression, the width of the gap seal 40 reduces. However, the depth of the gap seal 40 does not increase, and the gap seal 40 retains a depth that corresponds to the depth, d, of the gap 30.

The elastomers typically used for gap seals in the prior art have a very high poisson's ratio in the region of 0.4999, and would therefore be expected to expand in the depth direction by an amount corresponding to the compression in the width direction. However, the material used for the gap seal 40 of the present invention is engineered to deliver a near-zero poisson's ratio. A poisson's ratio of equal to or less than 0.1 is acceptable, but it is preferably equal to or less than 0.05+/− 20%.

Figure 3:
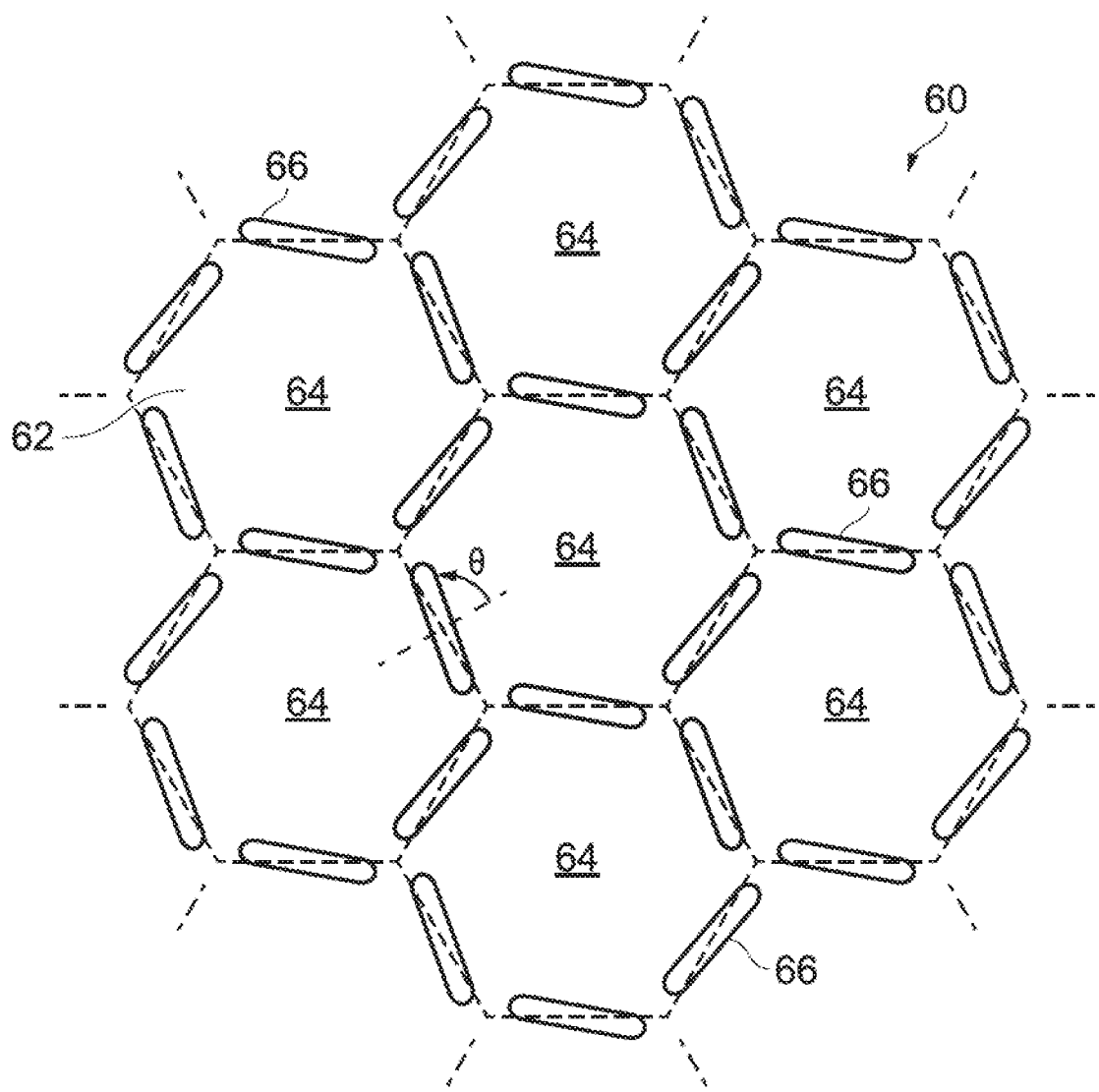
FIG. 3 schematically illustrates a suitable structure for a material suitable for a gap seal for use in an aircraft panel assembly according to an embodiment of the invention.

FIG. 3 shows a detail view of a macro-structure of a material 60 suitable for forming the gap seal 40. The material comprises a substrate 62 formed with a grid of identical cells 64. Each cell 64 has a generally hexagonal shape, with a slot-shaped aperture 66 at each of its six edges. Each aperture is orientated so that its longitudinal axis is at an angle θ to the normal of its respective notional edge of the hexagon. This angle θ is uniform for each of the six apertures, so that the cell 64 has six-fold rotational symmetry. The cells 64 are arranged in the grid such that each cell 64 has a different neighbour at each of its six sides, and neighbouring cells 64 share a common aperture at the interface between them. The grid thus resembles a honeycomb structure.

Materials suitable for providing the substrate 62 of the material 60 include elastomers, polyurethane, polytetrafluoroethylene (PTFE), silicon rubber, neoprene and cork. Suitable materials must be able to meet airworthiness requirements to ensure durability in the harsh environmental conditions experienced by aircraft. The material 60 may be formed by additive manufacturing methods (3D printing) or any other suitable method.

Materials having other macro-structures or micro-structures are suitable for forming the gap seal 40. For example, the cell 64 may have a different number of sides, such as three or more sides, and/or the apertures 66 may have a different shape or orientation. In other embodiments the material may comprise an isotropic lattice comprising interconnected cells each formed from arm members forming a two-dimensional or three-dimensional truss.

Further information on suitable material macro-structures and micro-structures may be found in Carta et al., "Continuous and discrete microstructured materials with null Poisson's ratio", Journal of the European Ceramic Society, 31 Dec. 2015.

FIGS. 4A-D illustrate an embodiment of the present invention integrated into a folding wing assembly. Features of this embodiment relating to the gap seal and blade seal are identical to those described above in relation to FIGS. 1 to 3.

Figure 4D:
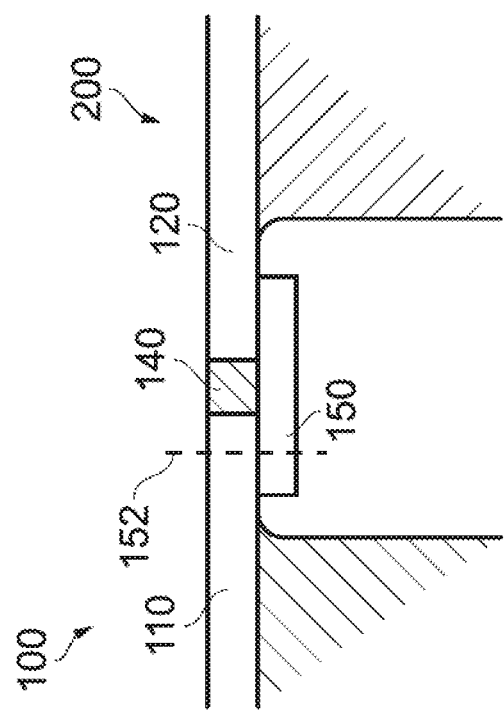
FIGS. 4C and 4D show front and section views, respectively, illustrating the folding wing embodiment of FIGS. 4A and 4B in a flight configuration.
Figure 4B:
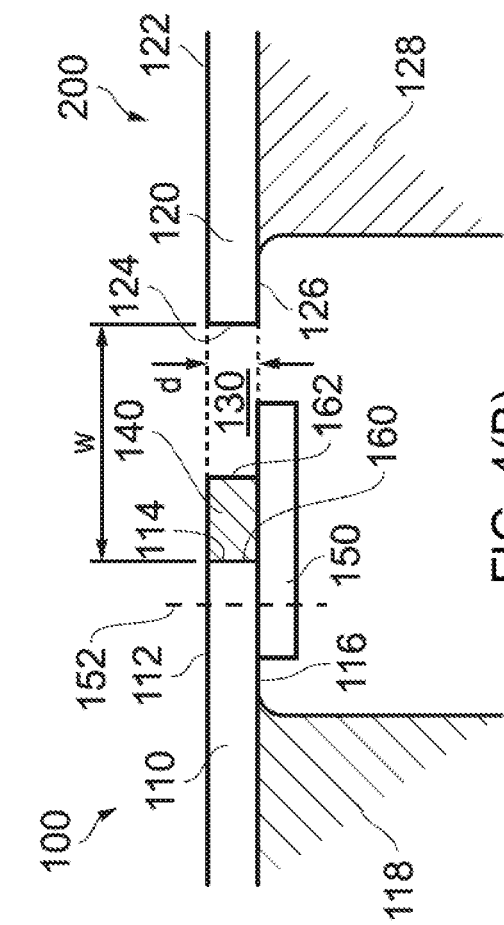
FIGS. 4A and 4B show front and section views, respectively, illustrating an aircraft panel assembly embodied in a folding wing embodiment of the invention in a folded configuration.
Figure 4C:
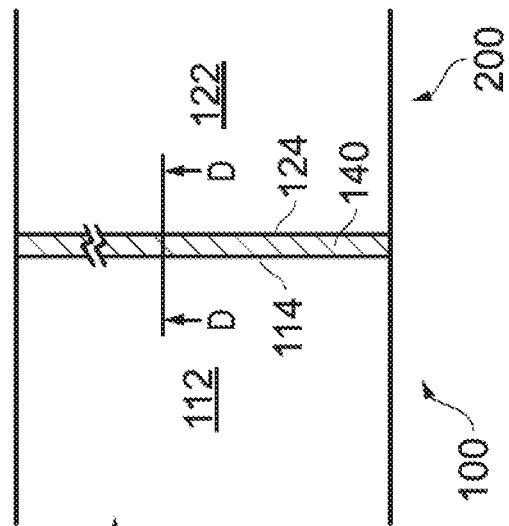
Figure 4A:
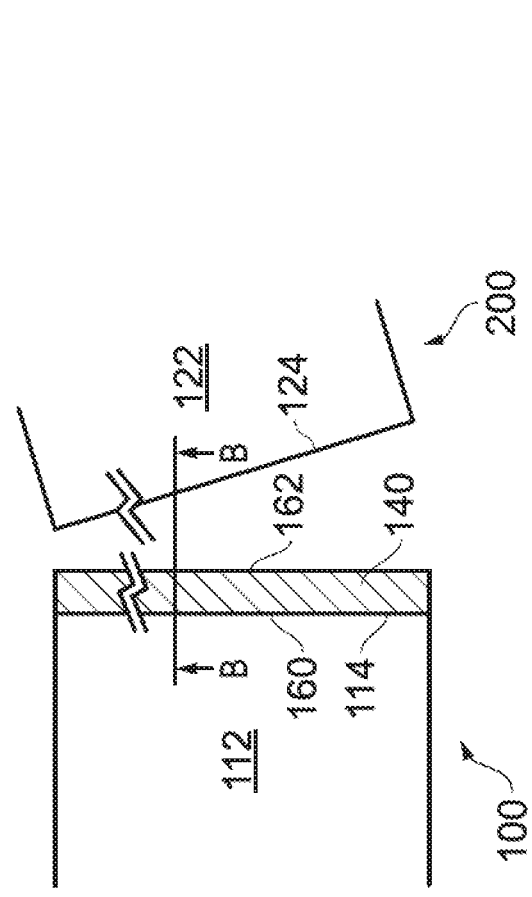

FIGS. 4A and B show the wing in a folded (open) configuration, and FIGS. 4C and 4D show the wing in a flight (closed) configuration. The folding wing assembly includes an inner wing section 100 and an outer wing section 200 which pivots relative to the inner wing section 100 between the open and closed configurations.

In the folded configuration (FIGS. 4A and B) the gap seal 140 partially extends across the width, w, of the gap 130, and extends across its full depth, d. Thus, the gap seal 140 is not compressed in the folded configuration.

As the outer wing section 200 pivots towards the inner wing section 100, the first and second panels 110, 120 move towards one another until the assembly is in the flight configuration shown in FIGS. 4C and D. During this process the width, w, of the gap 130 reduces so that the internal surface 126 of the second panel 120 slides across the blade seal 150, and the gap seal 140 is compressed in the first direction (the width direction).

As a result of this compression, the width of the gap seal 140 reduces. However, the depth of the gap seal 140 does not increase, and the gap seal 140 retains a depth that corresponds to the depth, d, of the gap 130. As described above in relation to the previous embodiments, this is achieved by engineering the material used for the gap seal 140 so that it has a near-zero poisson's ratio. A poisson's ratio of equal to or less than 0.1 is acceptable, but it is preferably equal to or less than 0.05+/−20%. The materials and material configurations described in relation to the previous embodiments are suitable for use in the present embodiment.

Although the invention has been described above with reference to one or more preferred embodiments, it will be appreciated that various changes or modifications may be made without departing from the scope of the invention as defined in the appended claims.

The invention claimed is:

1. An aircraft assembly comprising:
   first and second external skin panels having opposing edge faces separated by a gap, the gap having a width in a first direction extending between the opposing edge faces and a depth in a second direction generally orthogonal to the first direction,
   a gap seal arranged in the gap to at least partially fill the gap,
   wherein the first and second external skin panels are configured to move relative to one another between a first configuration in which the gap seal is arranged in the gap to at least partially fill the gap and a second configuration in which the gap seal is compressed in the first direction, and
   wherein the gap seal comprises material configured such that compression of the gap seal in the first direction across the width of the gap results in substantially no expansion of the gap seal in the second direction corresponding to a depth of the gap.

2. The assembly according to claim 1, wherein the material of the gap seal has a Poisson's ratio in at least the first direction:
   equal to or less than 0.1; or
   equal to or less than 0.06; or
   equal to or less than 0.05.

3. The assembly according to claim 1, wherein the material of the gap seal comprises a grid of cells.

4. The assembly according to claim 3, wherein the material comprises a substrate and each cell comprises a uniform pattern of apertures in the substrate.

5. The assembly according to claim 1, wherein the material is formed from at least one of the following: polyurethane; polytetrafluoroethylene; an elastomer, including silicon rubber or neoprene; or cork.

6. The assembly according to claim 1, including a blade seal attached to the first or second external skin panel and extending across the width of the gap to obscure the gap in at least the second configuration.

7. The assembly according to claim 6, wherein the blade seal is configured to slide relative to the other of the first or second external skin panel, respectively, during relative movement of the first and second external skin panels.

8. The assembly according to claim 1, wherein the gap seal is fixed to the opposing edge face of a respective one of the first or second external skin panel, and is not fixed to the opposing edge face of the other of the first or second external skin panel.

9. The assembly according to claim 1, including a friction layer between the gap seal and the opposing edge face of the other of the first or second external skin panel, wherein the friction layer has a higher coefficient of friction than the gap seal.

10. The assembly according to claim 1, wherein a respective one of the first and second external skin panels comprises a panel of one of a movable control surface, an access door, and a landing gear bay door.

11. The assembly according to claim 1, wherein the aircraft assembly includes an inner wing section comprising the first external skin panel, and an outer wing section comprising the second external skin panel, the outer wing being pivotable relative to the inner wing between a folded configuration in which the first and second external skin panels are separated, and a flight configuration in which the gap seal is compressed in the first direction.

12. An aircraft comprising the assembly according to claim 1.

13. An assembly to seal a gap comprising:
   a gap between opposing edges of external skin panels on an aircraft,
   a gap seal in the gap wherein the gap seal has a width commensurate to a width of the gap along a direction parallel to at least one of the external skin panels,
   wherein a material forming the gap seal has a Poisson's ratio of no greater than 0.1, and
   wherein the external skin panels are configured to move relative to one another between a first configuration in which the gap seal is arranged in the gap to at least partially fill the gap and a second configuration in which the gap seal is compresses in the first direction.

14. The assembly of claim 13 wherein a thickness of the gap seal is commensurate with a thickness of each of the external skin panels.

15. The assembly of claim 13 wherein the gap seal is compressed by the opposing edges.

16. The assembly of claim 13 wherein the material forming the gap seal includes a substrate layer and slots in the substrate layer, wherein the slots are arranged in a pattern forming repeating cells on the layer.

17. The assembly of claim 16 wherein the cells are each hexagonal in shape.

* * * * *